United States Patent
Fukuda et al.

(10) Patent No.: US 12,172,211 B2
(45) Date of Patent: Dec. 24, 2024

(54) METHOD FOR PRODUCING MAGNETIC REFRIGERATION MATERIAL, AND MAGNETIC REFRIGERATION MATERIAL

(71) Applicant: SHIN-ETSU CHEMICAL CO., LTD., Tokyo (JP)

(72) Inventors: Junya Fukuda, Echizen (JP); Tetsuya Kume, Echizen (JP); Koichi Hirota, Echizen (JP); Hajime Nakamura, Echizen (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 0 days.

(21) Appl. No.: 18/460,768

(22) Filed: Sep. 5, 2023

(65) Prior Publication Data

US 2023/0405670 A1     Dec. 21, 2023

Related U.S. Application Data

(62) Division of application No. 18/173,140, filed on Feb. 23, 2023, now Pat. No. 11,806,782.

(30) Foreign Application Priority Data

Mar. 24, 2022 (JP) ................. 2022-048219

(51) Int. Cl.
| | |
|---|---|
| B22F 1/00 | (2022.01) |
| B22F 9/02 | (2006.01) |
| B22F 9/04 | (2006.01) |
| C21D 6/00 | (2006.01) |
| C22C 38/00 | (2006.01) |
| C22C 38/02 | (2006.01) |
| C22C 38/04 | (2006.01) |
| C22C 38/06 | (2006.01) |
| H01F 1/04 | (2006.01) |

(52) U.S. Cl.
CPC .............. *B22F 1/09* (2022.01); *B22F 9/023* (2013.01); *B22F 9/04* (2013.01); *C21D 6/005* (2013.01); *C21D 6/008* (2013.01); *C22C 38/00* (2013.01); *C22C 38/005* (2013.01); *C22C 38/02* (2013.01); *C22C 38/04* (2013.01); *C22C 38/06* (2013.01); *H01F 1/04* (2013.01); *B22F 2301/355* (2013.01); *C22C 2202/02* (2013.01)

(58) Field of Classification Search
None
See application file for complete search history.

(56) References Cited

U.S. PATENT DOCUMENTS

| | | | |
|---|---|---|---|
| 5,887,449 | A | 3/1999 | Pecharsky et al. |
| 2004/0093877 | A1 | 5/2004 | Wada et al. |
| 2020/0191449 | A1 | 6/2020 | Bae |

FOREIGN PATENT DOCUMENTS

| | | |
|---|---|---|
| JP | 2003-028532 | 1/2003 |
| JP | 2007-263479 | 10/2007 |
| JP | 2009204234 A | 9/2009 |
| JP | 2014015678 A | 1/2014 |
| JP | 2018080853 A | 5/2018 |
| WO | WO 2008/122535 | 10/2008 |
| WO | WO2011039804 A1 | 4/2011 |
| WO | WO 2016/096512 | 6/2016 |

OTHER PUBLICATIONS

Extended European Search Report issued Aug. 31, 2023, in corresponding European Patent Application No. 23158094.
Office Action received on Nov. 5, 2024, in corresponding Japanese Patent Application No. 2022-048219 (with English machine translation).

*Primary Examiner* — Anthony M Liang
(74) *Attorney, Agent, or Firm* — Oblon, McClelland, Maier & Neustadt, L.L.P.

(57) ABSTRACT

Provided is a magnetic refrigeration material whose magnetic transition temperature has been adjusted with high accuracy and which includes at least a first predetermined magnetic refrigeration material and a second predetermined magnetic refrigeration material which differs from the first magnetic refrigeration material. The absolute value of the difference between the magnetic transition temperature of the present magnetic refrigeration material and a target magnetic transition temperature is 0.7 K or less. The content of the first magnetic refrigeration material and the content of the second magnetic refrigeration material are determined by the magnetic transition temperatures of the first magnetic refrigeration material and the second magnetic refrigeration material and by a target magnetic transition temperature of the magnetic refrigeration material.

5 Claims, 1 Drawing Sheet

FIG. 1

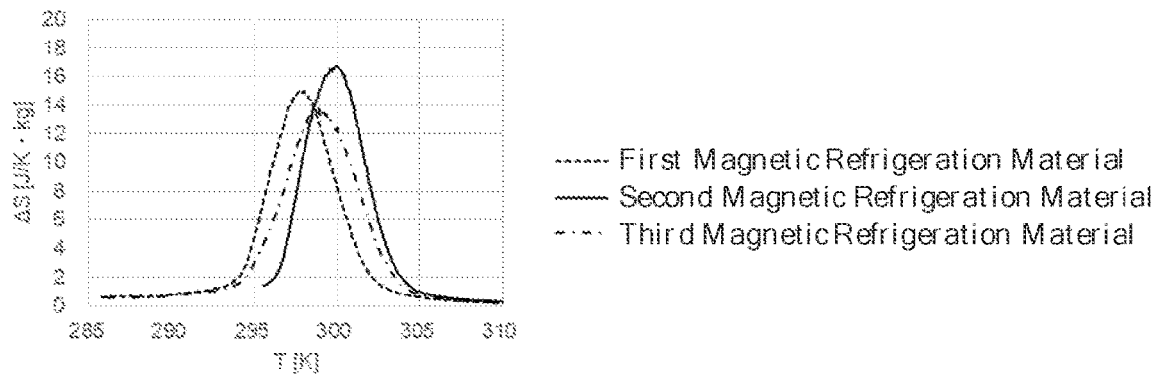

- - - - - First Magnetic Refrigeration Material
——— Second Magnetic Refrigeration Material
- - - - Third Magnetic Refrigeration Material

FIG. 2

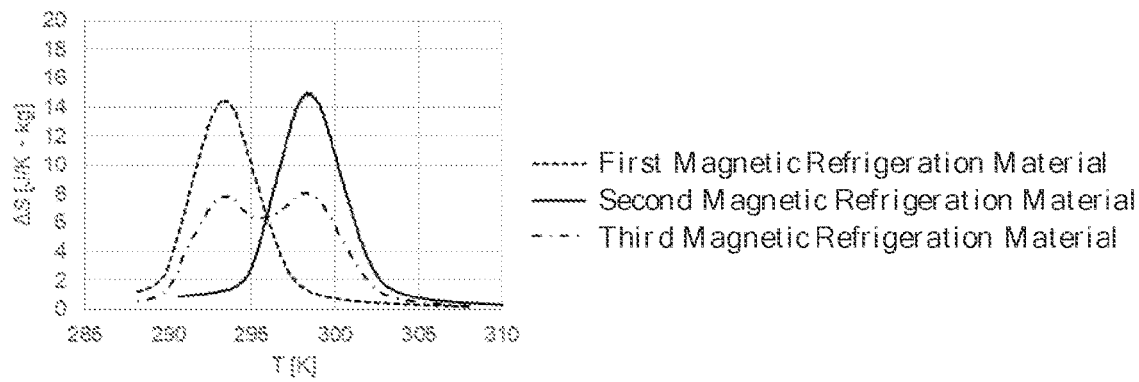

- - - - - First Magnetic Refrigeration Material
——— Second Magnetic Refrigeration Material
- - - - Third Magnetic Refrigeration Material

FIG. 3

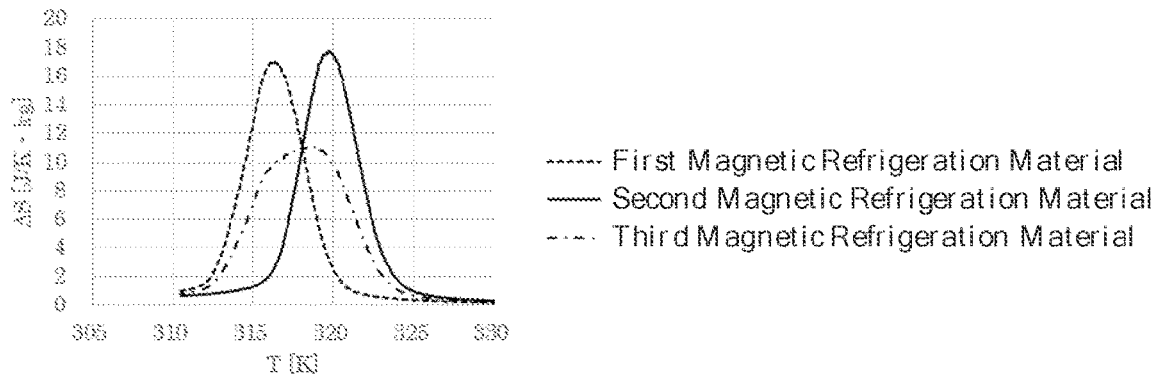

- - - - - First Magnetic Refrigeration Material
——— Second Magnetic Refrigeration Material
- - - - Third Magnetic Refrigeration Material

METHOD FOR PRODUCING MAGNETIC REFRIGERATION MATERIAL, AND MAGNETIC REFRIGERATION MATERIAL

CROSS REFERENCE TO RELATED APPLICATIONS

This application is a divisional application of prior U.S. application Ser. No. 18/173,140, filed Feb. 23, 2023, the disclosure of which is incorporated herein by reference in its entirety. U.S. application Ser. No. 18/173,140 claims priority to Japanese Application No. 2022-048219, filed Mar. 24, 2022, the disclosure of which is incorporated herein by reference in its entirety.

FIELD OF THE INVENTION

The present invention relates to a magnetic refrigeration material whose magnetic transition temperature can be controlled with high accuracy, and to a method for producing the material.

BACKGROUND OF THE INVENTION

Fluorocarbons are ozone-depleting substances and global warming gases; therefore, new refrigeration/air conditioning systems that do not use any fluorocarbon are of current interest from the viewpoint of environmental conservation. Refrigerants which take the place of fluorocarbons are being actively developed. However, no new refrigerant has yet been put into practical use which is satisfactory in terms of performance, cost and safety.

On the other hand, a magnetic refrigeration system which, unlike conventional refrigeration/air conditioning systems, uses a change in entropy with an increase in the magnetic field (magnetocaloric effect, $\Delta S$) is also of current interest. Examples of materials having a large absolute value of $\Delta S$ include $Mn(As_{1-x}Sb_x)$ (PTL 1) and $La(Fe_{1-x}Si_x)_{13}H_x$ (PTL 2). In particular, the former material has a very large $\Delta S$ of $-30$ J/kg K and can be an excellent magnetic refrigeration material. However, since As, which is a component of $Mn(As_{1-x}Sb_x)$, exhibits toxicity, it is practically difficult to use the material. $La(Fe_{1-x}Si_x)_{13}H_x$ is a most promising substance because it has a $\Delta S$ of $-25$ J/kg K, which is the second largest after $Mn(As_{1-x}Sb_x)$, and its constituent elements do not exhibit toxicity and are not rare metals. The change $\Delta S$ occurs only at a limited temperature around the Curie temperature (Tc) of a material which shows a magnetocaloric effect; a single material can only operate at a particular temperature. This makes it impossible to provide a refrigeration system which needs to produce a substantially wide temperature difference. Therefore, a method is employed to change the operating temperature of a material. An exemplary method involves substituting part of the components with other element(s).

Such materials are required to operate at a temperature around room temperature (about $-70$ to $+70°$ C.). However, unlike conventional magnetic refrigeration which has been used as a means for generating extremely low temperatures which are difficult to generate with gas refrigeration, there is the problem of a reduction in the magnetocaloric effect due to non-negligible lattice vibration at the above operating temperature. An AMR (Active Magnetic Regenerative) cycle, which uses the lattice vibration as a heat accumulation effect, has been developed, and a refrigeration/air conditioning system which uses a magnetocaloric effect and operates at a temperature around room temperature is becoming a reality.

In the AMR cycle, a container is filled with a magnetic refrigeration material having spaces which permit passage therethrough of a heat medium such as water (called a bed). The heat medium can move to a hot end and to a cold end through the spaces. When the heat medium lies on the cold-end side, a magnetic field is applied to the bed e.g. by means of a permanent magnet, thereby reducing the entropy of the magnetic refrigeration material and raising the temperature of the material. The heat medium is moved from the cold-end side to the hot-end side. The heat medium receives heat from the magnetic refrigeration material while the heat medium is moving to the hot-end side, and exhausts the heat at the hot end using a heat exchanger. Subsequently, the magnetic field of the permanent magnet is removed, whereby the entropy of the magnetic refrigeration material increases and the temperature decreases. The heat medium is moved from the hot-end side to the cold-end side. The heat medium is cooled by the magnetic refrigeration material while the heat medium is moving to the cold-end side. The cooled heat medium absorbs heat through a heat exchanger. Repetitions of this cycle produce a temperature difference between the hot end and the cold end, creating a refrigeration cycle.

In the AMR cycle, the temperature difference that can be produced by a single-composition material is about 2 to 10 K and varies depending on the material. In order to produce a large temperature difference as required for applications such as refrigerators and air conditioners, magnetic refrigeration materials with different magnetic transition temperatures (Tc) are filled into a container in such a manner that the various materials are arranged from the hot end to the cold end in order of decreasing magnetic transition temperature (Tc) (cascade filling), and heat exchange is performed between adjacent magnetic refrigeration materials. In order to perform the heat exchange, it is necessary that the operating temperatures of adjacent magnetic refrigeration materials overlap to some extent. Therefore, the Tc of each magnetic refrigeration material, constituting the cascade, needs to be controlled taking the half width of the material into consideration.

CITATION LIST

Patent Literature

PTL 1: JP2003-28532A
PTL 2: JP2006-89839A

SUMMARY OF THE INVENTION

Technical Problem

In order to enhance the heat exchange efficiency of the AMR cycle using cascade filling, it is necessary to adjust the magnetic transition temperature (Tc) of each magnetic refrigeration material, constituting the cascade, with higher accuracy. For example, in the case of $La(Fe_{1-x}Si_x)_{13}H_x$, which is a promising material, there is a possibility that production variations of about 1 K with respect to a target Tc will occur despite adjustment of Tc. When a material whose Tc deviates from a target value is used in an AMR apparatus, the variation of Tc may impair the cascade connection. This may result in performance deterioration such as a failure to produce the intended temperature difference or a longer time taken to produce the intended temperature difference.

The present invention has been made in view of the above situation. It is therefore an object of the present invention to provides a method for producing a magnetic refrigeration material whose magnetic transition temperature can be adjusted with high accuracy, and to provide a magnetic refrigeration material whose magnetic transition temperature can be adjusted with high accuracy.

Solution to Problem

The present inventors, through their intensive studies to achieve the object, have found that by mixing two or more magnetic refrigeration materials, having different magnetic transition temperatures and having a transition temperature difference/half width ratio of 0.9 or less, in predetermined proportions, the magnetic transition temperature of the resulting magnetic refrigeration material can be adjusted to a target magnetic transition temperature with an accuracy in the range of 0.7 K. The present invention has been accomplished based on this finding.

Thus, the present invention provides the following means [1] to [5].

[1] A method for producing a magnetic refrigeration material, including the steps of:
preparing a first magnetic refrigeration material which satisfies the following formula (1), and a second magnetic refrigeration material which differs from the first magnetic refrigeration material and satisfies the following formula (2); and
mixing the first magnetic refrigeration material and the second magnetic refrigeration material to obtain a third magnetic refrigeration material,
wherein the content ($A_1$) of the first magnetic refrigeration material and the content ($A_2$) of the second magnetic refrigeration material in the third magnetic refrigeration material per 100 parts by mass of the sum of the content ($A_1$) and the content ($A_2$) satisfy the following formulae (3) and (4):

$$-0.9 \leq (T_1-T_2)/W_1 \leq 0.9 \quad (1)$$

$$-0.9 \leq (T_1-T_2)/W_2 \leq 0.9 \quad (2)$$

$$((T_2-T_T)/(T_2-T_1)) \times 100-20 \leq A_1 \leq ((T_2-T_T)/(T_2-T_1)) \times 100+20 \quad (3)$$

$$((T_1-T_T)/(T_1-T_2)) \times 100-20 \leq A_2 \leq ((T_1-T_T)/(T_1-T_2)) \times 100+20 \quad (4)$$

where $T_1$ represents the magnetic transition temperature (K) of the first magnetic refrigeration material, $T_2$ represents the magnetic transition temperature (K) of the second magnetic refrigeration material, $W_1$ represents the half width (K) of the peak of a curve showing the temperature dependence of the magnetic entropy change in the first magnetic refrigeration material, $W_2$ represents the half width (K) of the peak of a curve showing the temperature dependence of the magnetic entropy change in the second magnetic refrigeration material, and $T_T$ represents a target magnetic transition temperature (K) of the third magnetic refrigeration material.

[2] The method for producing a magnetic refrigeration material as described in [1] above, wherein at least one of the first magnetic refrigeration material and the second magnetic refrigeration material is a material obtained by mixing two types of magnetic refrigeration materials, and wherein for each of the two types of magnetic refrigeration materials, the absolute value of a value obtained by dividing the difference between the magnetic transition temperatures of the two types of magnetic refrigeration materials by the half width of the peak of a curve showing the temperature dependence of the magnetic entropy change is 0.9 or less.

[3] The method for producing a magnetic refrigeration material as described in [1] or [2] above, wherein the first magnetic refrigeration material further satisfies the following formula (5), and the second magnetic refrigeration material further satisfies the following formula (6):

$$-0.4 \leq (T_1-T_2)/W_1 \leq 0.4 \quad (5)$$

$$-0.4 \leq (T_1-T_2)/W_2 \leq 0.4 \quad (6)$$

where $T_1$ represents the magnetic transition temperature (K) of the first magnetic refrigeration material, $T_2$ represents the magnetic transition temperature (K) of the second magnetic refrigeration material, $W_1$ represents the half width (K) of the peak of a curve showing the temperature dependence of the magnetic entropy change in the first magnetic refrigeration material, and $W_2$ represents the half width (K) of the peak of a curve showing the temperature dependence of the magnetic entropy change in the second magnetic refrigeration material.

[4] The method for producing a magnetic refrigeration material as described in any one of [1] to [3] above, wherein the absolute value of the difference ($T_3-T_T$) between the magnetic transition temperature ($T_3$) (K) of the third magnetic refrigeration material and the target magnetic transition temperature ($T_T$) (K) is 0.7 K or less.

[5] A magnetic refrigeration material including at least a first magnetic refrigeration material which satisfies the following formula (7), and a second magnetic refrigeration material which differs from the first magnetic refrigeration material and satisfies the following formula (8), wherein the absolute value of the difference between the magnetic transition temperature and a target magnetic transition temperature is 0.7 K or less:

$$-0.9 \leq T_1-T_2)/W_1 \leq 0.9 \quad (7)$$

$$-0.9 \leq (T_1-T_2)/W_2 \leq 0.9 \quad (8)$$

where $T_1$ represents the magnetic transition temperature (K) of the first magnetic refrigeration material, $T_2$ represents the magnetic transition temperature (K) of the second magnetic refrigeration material, $W_1$ represents the half width (K) of the peak of a curve showing the temperature dependence of the magnetic entropy change in the first magnetic refrigeration material, and $W_2$ represents the half width (K) of the peak of a curve showing the temperature dependence of the magnetic entropy change in the second magnetic refrigeration material.

Advantageous Effect of the Invention

The present invention makes it possible to provide a magnetic refrigeration material whose magnetic transition temperature ($T_C$) can be adjusted with high accuracy.

BRIEF DESCRIPTION OF THE DRAWINGS

FIG. 1 is a diagram showing the ΔS-T characteristics of the magnetic refrigeration materials of Example 1.

FIG. 2 is a diagram showing the ΔS-T characteristics of the magnetic refrigeration materials of Comparative Example 1.

FIG. 3 is a diagram showing the ΔS-T characteristics of the magnetic refrigeration materials of Example 9.

DETAILED DESCRIPTION OF THE INVENTION

Magnetic Refrigeration Material Production Method

The magnetic refrigeration material production method of the present invention includes the steps of: preparing a first magnetic refrigeration material which satisfies the following formula (1), and a second magnetic refrigeration material which differs from the first magnetic refrigeration material and satisfies the following formula (2); and mixing the first magnetic refrigeration material and the second magnetic refrigeration material to obtain a third magnetic refrigeration material, wherein the content ($A_1$) (parts by mass) of the first magnetic refrigeration material and the content ($A_2$) (parts by mass) of the second magnetic refrigeration material in the third magnetic refrigeration material per 100 parts by mass of the sum of the content ($A_1$) and the content ($A_2$) satisfy the following formulae (3) and (4):

$$-0.9 \leq -(T_1-T_2)/W_1 \leq 0.9 \quad (1)$$

$$-0.9 \leq (T_1-T_2)/W_2 \leq 0.9 \quad (2)$$

$$((T_2-T_T)/(T_2-T_1)) \times 100 - 20 \leq A_1 \leq ((T_2-T_T)/(T_2-T_1)) \times 100 + 20 \quad (3)$$

$$((T_1-T_T)/(T_1-T_2)) \times 100 - 20 \leq A_2 \leq ((T_1-T_T)/(T_1-T_2)) \times 100 + 20 \quad (4)$$

where $T_1$ represents the magnetic transition temperature (K) of the first magnetic refrigeration material, $T_2$ represents the magnetic transition temperature (K) of the second magnetic refrigeration material, $W_1$ represents the half width (K) of the peak of a curve showing the temperature dependence of the magnetic entropy change in the first magnetic refrigeration material, $W_2$ represents the half width (K) of the peak of a curve showing the temperature dependence of the magnetic entropy change in the second magnetic refrigeration material, and $T_T$ represents a target magnetic transition temperature (K) of the third magnetic refrigeration material. In an AMR apparatus, magnetic refrigeration materials are filled into a container in order of decreasing magnetic transition temperature to form a bed. Thus, magnetic refrigeration materials, whose magnetic transition temperatures vary from high to low, are required for an AMR apparatus. The target magnetic transition temperature ($T_T$) of the third magnetic refrigeration material is, for example, a magnetic transition temperature required for the material when it constitutes a bed of an AMR apparatus.

The first magnetic refrigeration material and the second magnetic refrigeration material for use in the magnetic refrigeration material production method of the present invention each preferably include at least one alloy selected from the group consisting of an R—Fe—Si alloy (R is a rare earth element) and an R—Fe—Si—H alloy (R is a rare earth element), whose main component has an $NaZn_{13}$-type structure, from the viewpoint of being able to stably achieve a significant magnetocaloric effect in a room-temperature range and from the viewpoint of no inclusion of a toxic element. The R—Fe—Si alloy can be obtained by melting/casting and homogenization performed in the usual manner. The R—Fe—Si—H alloy can be obtained by melting/casting, homogenization and hydrogenation performed in the usual manner. The content of the alloy(s) in each of the first magnetic refrigeration material and the second magnetic refrigeration material is preferably 90% by mass or more, more preferably 95% by mass or more, and even more preferably 98% by mass or more.

The R—Fe—Si alloy whose main component has an $NaZn_{13}$-type structure includes, for example, an alloy including as a main component an $R^1(Fe, Si)_{13}$ compound ($R^1$: 7.14 atom %) having an $NaZn_{13}$-type structure. In a preferable alloy composition of the alloy, the content of $R^1$ ($R^1$ is at least one selected from rare earth elements and Zr, and essentially includes La) is 6 to 10 atom %, and the amount of Si is 9 to 12 atom % of the total amount of the elements, other than $R^1$, of the compound. Preferably, a series of alloys with different Curie temperatures (e.g. alloys including as a main component an $R^1(Fe, M, Si)_{13}$ compound ($R^1$: 7.14 atom %) having a $NaZn_{13}$-type structure) are produced by replacing part of Fe in the $R^1(Fe, Si)$ compound with M (at least one element selected from the group consisting of Co, Mn, Ni, Al, Zr, Nb, W, Ta, Cr, Cu, Ag, Ga, Ti and Sn).

The alloy can be produced by melting a raw metal or alloy in a vacuum or in an inert gas atmosphere, preferably in an Ar atmosphere, and casting the melt into a flat mold or book mold, or subjecting the melt to liquid quenching or strip casting. The alloy may preferably be obtained in a powdery form through an atomizing process. Depending on the alloy composition, the cast alloy may consist of a primary crystal α-Fe phase and an R—Si phase (R is a rare earth element). In that case, in order to form an $R(Fe, Si)_{13}$ compound (R is a rare earth element), the cast alloy may be subjected to homogenization for a predetermined time (10 hours to 30 days depending on the structural morphology) at a temperature near or below the decomposition temperature of the compound (about 900 to 1300° C. greatly depending on the alloy composition).

The alloy after homogenization, whose main component is now an $R(Fe, Si)_{13}$ compound, exhibits brittleness and can be easily pulverized into powder of several hundred μm or less by mechanical pulverization. When H is to be absorbed, the alloy may be subjected to a heat treatment in a hydrogen atmosphere after or without rough pulverization. While the treatment conditions vary according to the amount of hydrogen to be absorbed, it is generally preferred to perform the heat treatment at 200 to 500° C. for about 1 to 20 hours under a hydrogen partial pressure of about 0.1 to 0.5 MPa. The alloy after the hydrogenation treatment is more brittle, and is often in a powdery form having a size of several hundred μm or less when it is taken out of a treatment apparatus.

The first magnetic refrigeration material for use in the magnetic refrigeration material production method of the present invention satisfies the above formula (1), and the second magnetic refrigeration material for use in the magnetic refrigeration material production method of the present invention satisfies the above formula (2). If the first magnetic refrigeration material does not satisfy the above formula (1) and the second magnetic refrigeration material does not satisfy the above formula (2), then the third magnetic refrigeration material, obtained after mixing of the first magnetic refrigeration material and the second magnetic refrigeration material, will exhibit a bimodal peak in a curve showing the temperature dependence of the entropy change (ΔS-T characteristics) in the third magnetic refrigeration material. Thus, the third magnetic refrigeration material apparently has two magnetic transition temperatures. This may result in a reduction in the heat exchange efficiency of an AMR apparatus cascade-filled with the magnetic refrigeration material. From such a viewpoint, it is preferred that the first magnetic refrigeration material further satisfies the following formula (5-1), and the second magnetic refrigeration material further satisfies the following formula (6-1). It is more preferred that the first magnetic refrigeration material further satisfies the following formula (5-2), and the second magnetic refrigeration material further satisfies the following formula (6-2). When the first magnetic refrigeration material and the second magnetic refrigeration material are used in combination, the ΔS value is sometimes lower than when the first magnetic refrigeration material or the second magnetic refrigeration material is used alone. The decreasing rate in ΔS due to the combination of the first magnetic refrigeration material and the second magnetic refrigeration material can be reduced when the first magnetic refrigeration material and the second magnetic refrigeration material satisfy the following formulae.

$$-0.4 \leq (T_1-T_2)/W_1 \leq 0.4 \tag{5-1}$$

$$-0.4 \leq (T_1-T_2)/W_2 \leq 0.4 \tag{6-1}$$

$$-0.2 \leq (T_1-T_2)/W_1 \leq 0.2 \tag{5-2}$$

$$-0.2 \leq (T_1-T_2)/W_2 \leq 0.2 \tag{6-2}$$

where $T_1$ represents the magnetic transition temperature (K) of the first magnetic refrigeration material, $T_2$ represents the magnetic transition temperature (K) of the second magnetic refrigeration material, $W_1$ represents the half width (K) of the peak of a curve showing the ΔS-T characteristics of the first magnetic refrigeration material, and $W_2$ represents the half width (K) of the peak of a curve showing the ΔS-T characteristics of the second magnetic refrigeration material.

The ΔS-T characteristics of a magnetic refrigeration material can be determined as follows. Using a vibrating sample magnetometer (VSM), the magnetic moment (M) of the magnetic refrigeration material is measured at varying temperatures from a high temperature to a low temperature under a magnetic field which increases stepwise from 0 T to 1 T at 0.2-T intervals to determine the detailed dependence (M (T, H)) of the magnetic moment (M) on temperature (T) and magnetic field (H). The results are substituted into the following equation to derive the ΔS-T characteristics of the magnetic refrigeration material.

$$\Delta S = \int_0^H \left( \frac{\partial M}{\partial T} \right)_H dH$$

The half width (K) of the peak of a curve showing the ΔS-T characteristics of a magnetic refrigeration material is herein defined as follows. When the ΔS value at the top of the peak of the curve showing the ΔS-T characteristics is represented by $\Delta S_{Max}$, the half width is defined as the absolute value of the difference $(T_a-T_b)$ between two temperatures $(T_a, T_b)$ at which the ΔS value in the peak is half the $\Delta S_{Max}$ value.

The third magnetic refrigeration material is obtained by mixing the first magnetic refrigeration material and the second magnetic refrigeration material. The content $(A_1)$ (parts by mass) of the first magnetic refrigeration material and the content $(A_2)$ (parts by mass) of the second magnetic refrigeration material in the third magnetic refrigeration material per 100 parts by mass of the sum of the content $(A_1)$ and the content $(A_2)$ satisfy the above formulae (3) and (4). If the content $(A_1)$ (parts by mass) of the first magnetic refrigeration material and the content $(A_2)$ (parts by mass) of the second magnetic refrigeration material do not satisfy the above formulae (3) and (4), the magnetic transition temperature of the third magnetic refrigeration material sometimes cannot be accurately adjusted to the target magnetic transition temperature $(T_T)$. The absolute value of the difference $(T_3-T_T)$ between the magnetic transition temperature $(T_3)$ (K) of the third magnetic refrigeration material and the target magnetic transition temperature $(T_T)$ is, for example, 0.7 K or less, preferably 0.5 K or less, and more preferably 0.3 K or less. Measurement of a magnetic transition temperature involves a measurement error of about ±0.2° C.; therefore, there can be an error of about 20 parts by mass in the above formulae (3) and (4). However, an error of 20 parts by mass or less has little influence on the system. Therefore, the value 20 is subtracted and added in each of the above formulae (3) and (4). There is no particular limitation on a method for mixing the first magnetic refrigeration material and the second magnetic refrigeration material. For example, the mixing can be performed in a V-blender.

From the viewpoint of adjusting the magnetic transition temperature of the third magnetic refrigeration material more accurately, the content $(A_1)$ (parts by mass) of the first magnetic refrigeration material and the content $(A_2)$ (parts by mass) of the second magnetic refrigeration material in the third magnetic refrigeration material per 100 parts by mass of the sum of the content $(A_1)$ and the content $(A_2)$ preferably satisfy the following formulae (3-1) and (4-1), more preferably satisfy the following formulae (3-2) and (4-2), even more preferably satisfy the following formulae (3-3) and (4-3), and still more preferably satisfy the following formulae (3-4) and (4-4).

$$((T_2-T_T)/(T_2-T_1))\times 100-10 \leq A_1 \leq ((T_2-T_T)/(T_2-T_1))\times 100+10 \tag{3-1}$$

$$((T_1-T_T)/(T_1-T_2))\times 100-10 \leq A_2 \leq ((T_1-T_T)/(T_1-T_2))\times 100+10 \tag{4-1}$$

$$((T_2-T_T)/(T_2-T_1))\times 100-5 \leq A_1 \leq ((T_2-T_T)/(T_2-T_1))\times 100+5 \tag{3-2}$$

$$((T_1-T_T)/(T_1-T_2))\times 100-5 \leq A_2 \leq ((T_1-T_T)/(T_1-T_2))\times 100+5 \tag{4-2}$$

$$((T_2-T_T)/(T_2-T_1))\times 100-3 \leq A_1 \leq ((T_2-T_T)/(T_2-T_1))\times 100+3 \tag{3-3}$$

$$((T_1-T_T)/(T_1-T_2))\times 100-3 \leq A_2 \leq ((T_1-T_T)/(T_1-T_2))\times 100+3 \tag{4-3}$$

$$((T_2-T_T)/(T_2-T_1))\times 100-1 \leq A_1 \leq ((T_2-T_T)/(T_2-T_1))\times 100+1 \tag{3-4}$$

$$((T_1-T_T)/(T_1-T_2))\times 100-1 \leq A_2 \leq ((T_1-T_T)/(T_1-T_2))\times 100+1 \tag{4-4}$$

Either one of the first magnetic refrigeration material and the second magnetic refrigeration material may be a material obtained by mixing two types of magnetic refrigeration materials, or both of the first magnetic refrigeration material and the second magnetic refrigeration material may each be a material obtained by mixing two types of magnetic refrigeration materials. In such a case, in each of the two types of magnetic refrigeration materials, constituting the first magnetic refrigeration material or the second magnetic refrigeration material, the absolute value of a value obtained by dividing the difference between the magnetic transition temperatures of the two types of magnetic refrigeration materials by the half width of the peak of a curve showing the temperature dependence of the magnetic entropy change is preferably 0.9 or less, more preferably 0.4 or less, and even more preferably 0.2 or less.

With respect to the magnetic refrigeration material produced in the above-described manner, the deviation of the magnetic transition temperature from the target magnetic transition temperature ($T_T$) can be controlled in the range of 0.7 K. The magnetic refrigeration material can sufficiently satisfy the accuracy of magnetic transition temperature required for the material when it is applied to the AMR cycle.

Magnetic Refrigeration Material

The magnetic refrigeration material of the present invention includes at least a first magnetic refrigeration material which satisfies the following formula (7-1), preferably satisfies the following formula (7-2), and a second magnetic refrigeration material which differs from the first magnetic refrigeration material and satisfies the following formula (8-1), preferably satisfies the following formula (8-2). The absolute value of the difference between the magnetic transition temperature and a target magnetic transition temperature is 0.7 K or less, preferably 0.5 K or less, and more preferably 0.3 K or less.

$$-0.9 \leq (T_1-T_2)/W_1 \leq 0.9 \quad (7\text{-}1)$$

$$-0.4 \leq (T_1-T_2)/W_1 \leq 0.4 \quad (7\text{-}2)$$

$$-0.9 \leq (T_1-T_2)/W_2 \leq 0.9 \quad (8\text{-}1)$$

$$-0.4 \leq (T_1-T_2)/W_2 \leq 0.4 \quad (8\text{-}2)$$

where $T_1$ represents the magnetic transition temperature (K) of the first magnetic refrigeration material, $T_2$ represents the magnetic transition temperature (K) of the second magnetic refrigeration material, $W_1$ represents the half width (K) of the peak of a curve showing the temperature dependence of the magnetic entropy change in the first magnetic refrigeration material, and $W_2$ represents the half width (K) of the peak of a curve showing the temperature dependence of the magnetic entropy change in the second magnetic refrigeration material.

The first magnetic refrigeration material and the second magnetic refrigeration material of the magnetic refrigeration material of the present invention are the same as those described above with reference to the magnetic refrigeration material production method of the present invention; therefore, a description of the first magnetic refrigeration material and the second magnetic refrigeration material of the magnetic refrigeration material of the present invention will be omitted.

The magnetic refrigeration material of the present invention may contain a magnetic refrigeration material other than the first magnetic refrigeration material and the second magnetic refrigeration material as long as the use of the other material does not to impair the effect of the present invention.

EXAMPLES

The following examples illustrate the present invention in greater detail and do not limit the scope of the invention in any way.

ΔS-T Characteristics of Magnetic Refrigeration Material

The dependence of the magnetic moment of a magnetic refrigeration material on temperature and magnetic field was measured using a vibrating sample magnetometer (VSM) (Versa Lab, manufactured by Quantum Design, Inc.). The ΔS-T characteristics of the magnetic refrigeration material were derived from the measurement results by the method described above. The decreasing rate in ΔS, which is expressed by the following formula, was calculated: ((ΔSav−ΔS$_3$)/ΔSav×100) (%), wherein ΔSav represents the average of the ΔS value (ΔS$_1$) at the top of the peak of a curve showing the ΔS-T characteristic of the first magnetic refrigeration material and the ΔS value (ΔS$_2$) at the top of the peak of a curve showing the ΔS-T characteristic of the second magnetic refrigeration material, and ΔS$_3$ represents the ΔS value at the top of the peak of a curve showing the ΔS-T characteristic of the third magnetic refrigeration material.

Example 1

An alloy 1 and an alloy 2, having the compositions shown in Table 1, were prepared. The alloys were subjected to a heat treatment at 1160° C. for 50 hours to homogenize the alloy, followed by a hydrogenation treatment for 8 hours at a temperature of 450° C. and a pressure of 0.27 MPa, thereby producing a first magnetic refrigeration material from the alloy 1 and a second magnetic refrigeration material from the alloy 2. The first magnetic refrigeration material and the second magnetic refrigeration material were designed to have different magnetic transition temperatures by using different Fe contents and different Mn contends in the two magnetic refrigeration materials. Table 2 shows the magnetic transition temperatures of the first magnetic refrigeration material and the second magnetic refrigeration material, and also shows values (magnetic transition temperature difference/half width) each obtained by dividing the difference in magnetic transition temperature between the first magnetic refrigeration material and the second magnetic refrigeration material by the half width. The mixing amounts of the first magnetic refrigeration material and the second magnetic refrigeration material were determined by the following equations (9) and (10) so that the magnetic transition temperature of a third magnetic refrigeration material, obtained by mixing the first magnetic refrigeration material and the second magnetic refrigeration material, would be 298.8 K (target magnetic transition temperature). The magnetic transition temperature and the decreasing rate in the ΔS value of the third magnetic refrigeration material obtained are shown in Table 2, and the ΔS-T characteristics of the third magnetic refrigeration material are shown in FIG. 1.

$$\text{Mixing amount (\% by mass) of the first magnetic refrigeration material} = ((T_2-T_T)/(T_2-T_1)) \times 100 \quad (9)$$

$$\text{Mixing amount (\% by mass) of the second magnetic refrigeration material} = ((T_1-T_T)/(T_1-T_2)) \times 100 \quad (10)$$

where $T_1$ represents the magnetic transition temperature (K) of the first magnetic refrigeration material, $T_2$ represents the magnetic transition temperature (K) of the second magnetic refrigeration material, and $T_T$ represents the target magnetic transition temperature (K).

Comparative Example 1

An alloy 1 and an alloy 2, having the compositions shown in Table 1, were prepared. The alloys were subjected to the same treatment as in Example 1 to produce a first magnetic refrigeration material from the alloy 1 and a second magnetic refrigeration material from the alloy 2. The first magnetic refrigeration material and the second magnetic refrigeration material were designed to have different magnetic transition temperatures by using different Mn contents in the two magnetic refrigeration materials. Table 2 shows the magnetic transition temperatures and the magnetic transition temperature difference/half width values of the first magnetic refrigeration material and the second magnetic refrigeration material. The mixing amounts of the first magnetic refrigeration material and the second magnetic refrigeration material were determined by the above equations (9) and (10) so that the magnetic transition temperature of a third magnetic refrigeration material, obtained by mixing the first magnetic refrigeration material and the second magnetic refrigeration material, would be 295.6 K (target magnetic transition temperature). The magnetic transition temperature and the decreasing rate in the ΔS value of the third magnetic refrigeration material obtained are shown in Table 2, and the ΔS-T characteristics of the third magnetic refrigeration material are shown in FIG. 2.

Examples 2 to 8

An alloy 1 and an alloy 2, having the compositions shown in Table 1, were prepared. The alloys were subjected to the same treatment as in Example 1 to produce a first magnetic refrigeration material from the alloy 1 and a second magnetic refrigeration material from the alloy 2. The first magnetic refrigeration material and the second magnetic refrigeration material were designed to have different magnetic transition temperatures by using different Fe contents and different Mn contents in the two magnetic refrigeration materials. Table 2 shows the magnetic transition temperatures and the magnetic transition temperature difference/half width values of the first magnetic refrigeration material and the second magnetic refrigeration material. The mixing amounts of the first magnetic refrigeration material and the second magnetic refrigeration material were determined by the above equations (9) and (10) so that a third magnetic refrigeration material, obtained by mixing the first magnetic refrigeration material and the second magnetic refrigeration material, would have the target magnetic transition temperature shown in Table 2. The magnetic transition temperature and the decreasing rate in the ΔS value of the third magnetic refrigeration material obtained are shown in Table 2.

Example 9

In Example 9, the third magnetic refrigeration material produced in Example 6 was used as a first magnetic refrigeration material, and the third magnetic refrigeration material produced in Example 7 was used as a second magnetic refrigeration material. Table 2 shows the magnetic transition temperatures and the magnetic transition temperature difference/half width values of the first magnetic refrigeration material and the second magnetic refrigeration material. The mixing amounts of the first magnetic refrigeration material and the second magnetic refrigeration material were determined by the above equations (9) and (10) so that a third magnetic refrigeration material, obtained by mixing the first magnetic refrigeration material and the second magnetic refrigeration material, would have the target magnetic transition temperature shown in Table 2. The magnetic transition temperature and the decreasing rate in the ΔS value of the third magnetic refrigeration material obtained are shown in Table 2, and the ΔS-T characteristics of the third magnetic refrigeration material are shown in FIG. 3.

Comparative Example 2

A third magnetic refrigeration material was produced in the same manner as in Example 1 except that the mixing amount of the first magnetic refrigeration material was changed to an amount which was 40% lower than the mixing amount determined by the above equation (9), and that the mixing amount of the second magnetic refrigeration material was changed to an amount which was 40% higher than the mixing amount determined by the above equation (10). The magnetic transition temperature and the decreasing rate in the ΔS value of the third magnetic refrigeration material obtained are shown in Table 2.

TABLE 1

| | Composition of alloy 1 (first magnetic refrigeration material) [at. %] | | | | | | Composition of alloy 2 (second magnetic refrigeration material) [at. %] | | | | | |
|---|---|---|---|---|---|---|---|---|---|---|---|---|
| | La | Ce | Fe | Al | Mn | Si | La | Ce | Fe | Al | Mn | Si |
| Ex. 1 | 5.26 | 2.26 | 81.36 | 0.00 | 0.95 | 10.17 | 5.26 | 2.26 | 81.44 | 0.00 | 0.87 | 10.17 |
| Ex. 2 | 5.26 | 2.26 | 81.88 | 0.00 | 0.43 | 10.17 | 5.26 | 2.26 | 81.85 | 0.00 | 0.46 | 10.17 |
| Ex. 3 | 5.26 | 2.26 | 80.83 | 0.00 | 1.48 | 10.17 | 5.26 | 2.26 | 80.91 | 0.00 | 1.40 | 10.17 |
| Ex. 4 | 5.26 | 2.26 | 81.88 | 0.00 | 0.48 | 10.17 | 5.26 | 2.26 | 81.85 | 0.00 | 0.46 | 10.17 |
| Ex. 5 | 5.26 | 2.26 | 80.98 | 0.00 | 1.33 | 10.17 | 5.26 | 2.26 | 80.91 | 0.00 | 1.40 | 10.17 |
| Ex. 6 | 5.26 | 2.26 | 82.05 | 0.00 | 0.26 | 10.17 | 5.26 | 2.26 | 82.10 | 0.00 | 0.21 | 10.17 |
| Ex. 7 | 5.26 | 2.26 | 82.25 | 0.00 | 0.06 | 10.17 | 5.26 | 2.26 | 82.31 | 0.00 | 0.00 | 10.17 |
| Ex. 8 | 7.27 | 0.00 | 82.53 | 3.71 | 0.04 | 6.49 | 7.27 | 0.00 | 82.53 | 3.71 | 0.00 | 6.49 |
| Comp. Ex. 1 | 5.26 | 2.26 | 81.36 | 0.00 | 1.03 | 10.17 | 5.26 | 2.26 | 81.36 | 0.00 | 0.95 | 10.17 |
| Comp. Ex. 2 | 5.26 | 2.26 | 81.36 | 0.00 | 0.95 | 10.17 | 5.26 | 2.26 | 81.44 | 0.00 | 0.87 | 10.17 |

TABLE 2

| | First magnetic refrigeration material | | | Second magnetic refrigeration material | | | Third magnetic refrigeration material | | | |
|---|---|---|---|---|---|---|---|---|---|---|
| | | | | | | | | | Deviation | |
| | Magnetic transition temperature [K.] | Magnetic transition temperature difference/ half width | Mixing ratio [mass %] | Magnetic transition temperature [K.] | Magnetic transition temperature difference/ half width | Mixing ratio [mass %] | Target magnetic transition temperature [K.] | Measured magnetic transition temperature [K.] | from target magnetic transition temperature [K.] | Decreasing rate in ΔS [%] |
| Ex. 1 | 297.8 | 0.4 | 50 | 299.8 | 0.5 | 50 | 298.8 | 299.0 | −0.1 | 12 |
| Ex. 2 | 309.8 | 0.3 | 56 | 310.7 | 0.2 | 44 | 310.2 | 310.4 | −0.2 | 4 |
| Ex. 3 | 283.0 | 0.7 | 50 | 286.0 | 0.7 | 50 | 284.5 | 284.3 | 0.2 | 22 |
| Ex. 4 | 309.8 | 0.3 | 22 | 310.7 | 0.2 | 78 | 310.5 | 310.0 | 0.5 | 0 |
| Ex. 5 | 286.0 | 0.3 | 23 | 287.3 | 0.3 | 77 | 287.0 | 287.8 | −0.3 | 3 |
| Ex. 6 | 315.1 | 0.5 | 39 | 316.9 | 0.6 | 61 | 316.2 | 316.4 | −0.2 | 11 |
| Ex. 7 | 319.2 | 0.3 | 55 | 320.3 | 0.3 | 45 | 319.7 | 319.8 | −0.1 | 6 |
| Ex. 8 | 172.1 | 0.1 | 60 | 173.1 | 0.1 | 40 | 172.5 | 172.8 | −0.3 | 1 |
| Ex. 9 | 316.2 | 0.8 | 49 | 319.7 | 0.8 | 51 | 318.0 | 318.0 | 0.0 | 36 |
| Comp. Ex. 1 | 293.3 | 1.0 | 49 | 297.8 | 1.0 | 51 | 295.6 | — | — | 0 |
| Comp. Ex. 2 | 297.8 | 0.4 | 10 | 299.8 | 0.5 | 90 | 298.9 | 299.7 | −0.8 | 1 |

The results indicate that by mixing a first magnetic refrigeration material and a second magnetic refrigeration material in mixing amounts that satisfy the above formulae (3) and (4), a third magnetic refrigeration material having a target magnetic transition temperature can be produced with an accuracy in the range of 0.7 K or less with respect to the target magnetic transition temperature. Thus, the results indicate that the magnetic transition temperature of a third magnetic refrigeration material can be controlled with high accuracy. The results also indicate that the decreasing rate in ΔS is large in Examples 3 and 9 in which the magnetic transition temperature difference/half width values are more than 0.4 and 0.9 or less, whereas the decreasing rate in ΔS is considerably lower in Examples in which the magnetic transition temperature difference/half width values are 0.4 or less.

FIG. 1 shows the ΔS-T characteristics of the magnetic refrigeration materials of Example 1. Since the magnetic transition temperature difference/half width values of the first magnetic refrigeration material and the second magnetic refrigeration material are 0.9 or less, the curve showing the ΔS-T characteristics of the third magnetic refrigeration material has a unimodal peak, not a bimodal peak.

FIG. 2 shows the ΔS-T characteristics of the magnetic refrigeration materials of Comparative Example 1. Since the magnetic transition temperature difference/half width values of the first magnetic refrigeration material and the second magnetic refrigeration material are more than 0.9, the curve showing the ΔS-T characteristics of the third magnetic refrigeration material has a bimodal peak. Thus, it is not possible to specify a single magnetic transition temperature for the third magnetic refrigeration material. When a third magnetic refrigeration material has a plurality of magnetic transition temperatures, it is difficult to use it as a magnetic refrigeration material to be cascade-filled into an AMR apparatus.

FIG. 3 shows the ΔS-T characteristics of the magnetic refrigeration materials of Example 9. The magnetic transition temperature difference/half width values of the first magnetic refrigeration material and the second magnetic refrigeration material are 0.8 and the decreasing rate in ΔS is large. Since the magnetic transition temperature difference/half width values are 0.9 or less, the curve showing the ΔS-T characteristics of the third magnetic refrigeration material has a unimodal peak, not a bimodal peak. The deviation of the measured magnetic transition temperature of the third magnetic refrigeration material from the target magnetic transition temperature is 0.7 K or less.

In Comparative Example 2, the mixing amounts of the first magnetic refrigeration material and the second magnetic refrigeration material do not satisfy the above formulae (3) and (4); therefore, the deviation of the measured magnetic transition temperature of the third magnetic refrigeration material from the target magnetic transition temperature is as large as 0.8 K.

The invention claimed is:

1. A magnetic refrigeration material comprising:
a first magnetic refrigeration material having a first magnetic transition temperature and satisfying formula (7), and
a second magnetic refrigeration material which differs from the first magnetic refrigeration material and has a second magnetic transition temperature and satisfies the following formula (8), wherein
the first magnetic refrigeration material and the second magnetic refrigeration material are combined to form the magnetic refrigeration material having a target magnetic transition temperature, and
an absolute value of the difference between the obtained magnetic transition temperature of the magnetic refrigeration material and the target magnetic transition temperature is 0.7 K or less:

$$-0.9 \leq (T_1-T_2)/W_1 \leq 0.9 \tag{7}$$

$$-0.9 \leq (T_1-T_2)/W_2 \leq 0.9 \tag{8}$$

where $T_1$ represents the magnetic transition temperature (K) of the first magnetic refrigeration material, $T_2$ represents the magnetic transition temperature (K) of the second magnetic refrigeration material, $W_1$ represents the half width (K) of the peak of a curve showing the temperature dependence of the magnetic entropy change in the first magnetic refrigeration material, and $W_2$ represents the half width (K) of the peak of a curve showing the temperature dependence of the magnetic entropy change in the second magnetic refrigeration material.

2. The magnetic refrigeration material according to claim 1, wherein the first magnetic refrigeration material and the second magnetic refrigeration material respectively comprise at least one alloy selected from the group consisting of an R—Fe—Si alloy and an R—Fe—Si—H alloy comprising a main component having an NaZn13-type structure, wherein R is a rare earth element.

3. The magnetic refrigeration material according to claim 1, wherein the first magnetic refrigeration material satisfies formula (7-2), and the second magnetic refrigeration material satisfies formula (8-2):

$$-0.4 \leq (T_1-T_2)/W_1 \leq 0.4 \quad (7\text{-}2)$$

$$-0.4 \leq (T_1-T_2)/W_2 \leq 0.4 \quad (8\text{-}2).$$

4. An Active Magnetic Regenerative (AMR) apparatus comprising the magnetic refrigeration material according to claim 1.

5. A heat exchange method by an AMR cycle using the magnetic refrigeration material according to claim 1.

* * * * *